United States Patent [19]

Huijsers

[11] 3,739,106

[45] June 12, 1973

[54] ARRANGEMENT AT MAGNET TAPE CARTRIDGE USING SEPARATE JACKS TO FORCE CORRECT SEQUENCE OF WRITING, READING, AND ERASING

[75] Inventor: Willem Huijsers, Farsta, Sweden

[73] Assignee: Hugin Kassaregister A.B., Stockholm, Sweden

[22] Filed: Aug. 13, 1971

[21] Appl. No.: 171,582

[30] Foreign Application Priority Data

Aug. 13, 1970 Sweden ............................ 11051/70

[52] U.S. Cl.179/100.2 Z, 179/100.2 D, 242/55.19 A, 274/4 B

[51] Int. Cl. ....................... G11b 15/04, G11b 23/04

[58] Field of Search ............ 179/100.2 Z, 100.2 D; 274/4 B, 4 C, 4 E, 4 F, 11 B, 11 C; 242/55.19 A, 199, 194, 197, 200; 226/89, 90

[56] References Cited

UNITED STATES PATENTS

| | | | |
|---|---|---|---|
| 2,466,514 | 4/1949 | Vagtborg | 179/100.2 Z |
| 3,175,222 | 3/1965 | Nerwin | 179/100.2 Z |
| 3,650,378 | 3/1972 | Kakiuchi | 179/100.2 Z |
| 2,612,565 | 9/1952 | Heller | 179/100.2 D |
| 3,488,058 | 1/1970 | Staar | 274/4 D |
| 3,037,093 | 5/1962 | Nowlan | 179/100.2 D |

*Primary Examiner*—Bernard Konick
*Assistant Examiner*—Alfred H. Eddleman
*Attorney*—Darby & Darby

[57] ABSTRACT

Computer processing often includes the insertion of a magnet tape cartridge into a jack to bring about the desired operation, i.e., writing, reading or erasing. The jacks are provided with actuating pins of different relative location to penetrate into an end recess in the cartridge and thereby to release the operation. According to the invention, the cartridge has at its insertion end two parallel slides mounted movably and provided with alternatingly inclined and plane guide edges and, respectively, stop edges for the actuating pins of the jacks to eliminate entirely the insertion of the cartridge into a wrong jack and thereby the risk of destroying valuable information. The cartridge in other words, is processed in a forced correct sequence writing, reading and erasing.

7 Claims, 3 Drawing Figures

ARRANGEMENT AT MAGNET TAPE CARTRIDGE USING SEPARATE JACKS TO FORCE CORRECT SEQUENCE OF WRITING, READING, AND ERASING

This invention relates to an arrangement at a magnet tape cartridge intended for computer processing after manual insertaion into a first jack for writing, a second jack for reading and a third jack for erasing of data, each operation being released by an actuating pin placed in each jack but adapted to change its position from one jack to another along the same line for penetrating into a correspondingly located end recess in the cartridge inserted in the jack in question.

At modern computers for commercial purposes, one often operates for rational reasons with magnet tape cartridges, on which the information is recorded, read and erased by manually inserting the cartridge into jacks for writing, reading and, respectively, erasing. Irrespective of whether writer, reader and eraser are centralized or decentralized, one cannot guard oneself, due to the human factor, against the insertion of a cartridge into a wrong jack. By such incorrect insertion information can get lost which may be more or less irreplaceable, for example when a cartridge with written data by mistake is inserted into an erasing jack or inserted again into a writing jack.

An arrangement for a forced control of the operation sequence wriging-reading-erasing is achieved by the invention, which is characterized in that for eliminating the risk of destroying recorded data by insertion of the cartridge into a wrong jack the cartridge is provided at its insertion end with at least two slides located to the side of each other and movable in parallel with said line, said slides being elastically interconnected and provided with shoulders having alternatingly inclined and plane guide edges and, respectively, stop edges such that upon the insertion of the cartridge into a wrong jack the pin of said jack is blocked by a stop edge, but upon the insertion of the cartridge into the correct jack the pin of said jack is pressed against a guide edge leading into said end recess to release the desired operation and so to displace one or the other of the slides that a free guide edge is exposed only for the pin in the subsequent correct jack within the operation cycle writing-reading-erasing.

A further characterizing feature of the invention is that the reader, which normally is the computer part most subjected to strain, is not loaded unnecessarily by making it read erased tapes. The invention also satisfies the demand for information on the state of processing of the cartridge.

Figure 1:
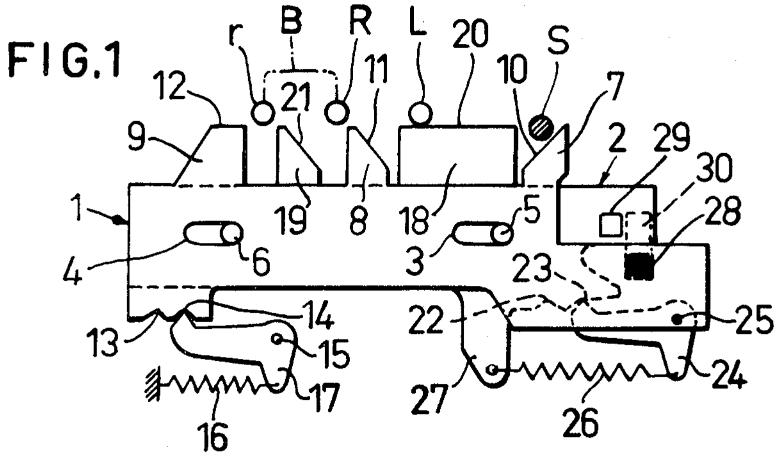
Figure 2:
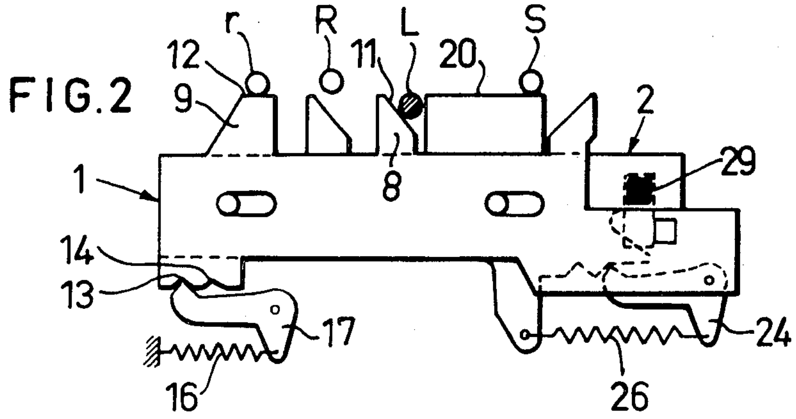
Figure 3:
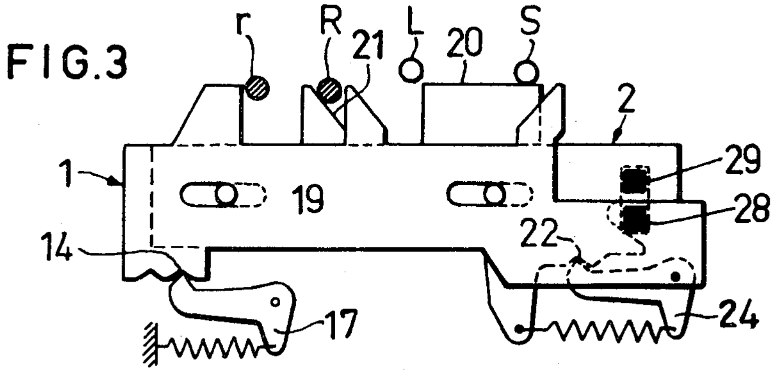

The invention is described in greater detail in the following with reference to the accompanying drawing, in which:

FIGS. 1–3 show in a schematic way lateral views of the arrangement according to the invention in three consecutive operating positions, the arrangement being applied to the insertion end of a cartridge.

The actuating pin associated to the respective jacks for writing, reading and erasing is shown symbolically in the Figures by way of circles designated by S, L, R and r. Although there is only one pin in each jack — with the exception of the erasing pins R and *r*, the occurrence of which in the same jack is symbolized by the dash-dotted bow B — all pins, for the sake of functional clarity, are entered into the drawing in the different operation steps according to FIGS. 1–3, in such a way, that the pin actually occurring — at the insertion into the correct jack — is marked by shading. Thus, FIG. 1 represents the insertion of the cartridge into a writing jack with the writer pin S, FIG. 2 represents the insertion into a reading jack with the reader pin L laterally offset relative to the pin S, and FIG. 3 represents the insertion into an erasing jack with the erasing pins R and *r*, laterally offset relative to the pin L.

The construction when one looks at it in connection with FIG. 1 shows the conditions at an erased, i.e., prepared for writing, cartridge on its way to be inserted into a writing jack. Two slides 1 and 2 abutting one another with their flat surfaces — slide 2 to its greater part is concealed by slide 1 which in FIG. 1 lies in front of slide 2 — are provided each with longitudinal guide slots 3 and 4 with which engage stationary guide pegs 5 and, respectively, 6. The slides thereby are adapted for movement in parallel with the line extending through the pins S (in non-operative position), L, R and *r*.

The forward slide 1 carries on its upper surface three shoulders 7, 8 and 8 with, respectively, a first oblique guide edge 10, a second opposedly oblique guide edge 11, and a horizontal stop edge 12. On its lower surface, the slide 1 is provided at its left-hand end in the Figure with two recesses 13 and 14 for snapping coaction with the point of an angular arm 17 pivotally mounted about a fixed point 15 and prestressed by a tension spring 16.

The slide 2 is provided on its upper surface with two shoulders 18 and 19 having a horizontal stop edge 20 and, respectively, an oblique guide edge 21. On its lower surface, the slide 2 has at its right-hand end two recesses 22 and 23 for snapping coaction with the point of an angular arm 24, which is pivotal about a point 25 on the right-hand end of slide 1 and maintained prestressed by a tension spring 26, which is secured in a tongue 27 projecting downwardly from the lower surface of slide 2. The spring 26, thus, forms an elastic connection between the slides 1 and 2.

Each of the slides 1 and 2 is provided at its right-hand end with a coloured field 28 and 29, respectively, which can become visible in a window 30 (indicated by dashed lines in FIG. 1) in the cartridge housing (not shown).

The arrangement described above operates as follows.

For an erased tape, i.e., when it is prepared for writing, the slides have the position shown in FIG. 1. This condition prepared for writing is marked by the coloured field 28 becoming visible in the window 30 of the cartridge housing. When the cartridge now is inserted into the correct jack, i.e., the writing jack, this does not meet any hindrance, as can be seen in FIG. 1, becuase the writer pin S by pressing against the guide edge 10 on the shoulder 7 of slide 1 can move the slide 1 to the right in the FIG. and slide into abutment to the upper surface of the slides. The slide 1 is arrested in its end position shown in FIG. 2, due to the fact that the snapping engagement of the angular arm 17 by the movement of slide 1 has been moved from the recess 14 to the recess 13. Simultaneously the tension spring 26 has been tightened and taken along the slide 2 such a distance (not shown) that its shoulder 18 with its right-hand vertical edge by spring prestress abuts the writer pin S.

It appears from FIG. 1 that no unnecessary reading would take place if the cartridge by mistake was inserted into a reading jack, bacause the shoulder 18 of slide 2 with its stop edge 20 blocks the reader pin L. If the cartridge would be inserted into an erasing jack, the eraser pins R and *r*, it is true, would unimpeded reach the upper surface of the slides and thereby release erasing, as can be seen in FIG. 1, but this does not have any detrimental effect because the tape is already erased and, furthermore, the rapid erasing operation does nto cause any appreciable loss of time.

Upon removing the cartridge from the writing jack after writing, the spring 26 still prestressed takes along consecutively the slide 2 to the end position shown in FIg. 2, and the cartridge now is prepared for reading, which is marked by the coloured field 29 now appearing in the window 30. As can be seen in FIg. 2, if the cartridge by mistake is inserted into a writing jack or erasing jack, the information stored by writing is not destroyed, because in the first case the writer pin S is blocked by the stop edge 20 of the slide, and in the second case the erasing is locked by the pin *r* being blocked by the stop edge 12 on the shoulder 9 of slide 1. Only at the insertion into the correct jack, i.e., the reading jack, an operation can be released, in that the reader pin L whilst sliding along the guide edge 11 on the shoulder 8 of slide 1 presses the shoulder and thereby the slide 1 back (to the left in the Figure) to the starting position of the slide, the point of the angular arm 17 being returned to engagement with the recess 14, as shown in FIG. 3. Furthermore, owing to the forced relative movement of the slides 1 and 2 (approaching of the point 25 and tongue 27) the angular arm 24 supported on the slide 1 has changed the snap engagement from the recess 23 of slide 2 to the recess 22 thereof, and both coloured fields 28 and 29 appear now in the housing window 30. This marking indicates the cartridge ready for erasing, which state is shown in FIG. 3. The cartridge, as appears from FIg. 3, is locked against new writing by the stop edge 20 of the slide 2 still blocking the writer pin S. Upon insertion of the cartridge into the reading jack, it is true, the reader pin L is offered free passage, which results in an unjustified re-reading, but no information will be lost. The desired operation, i.e., erasing, is released only when the cartridge is inserted into an erasing jack, because the pin *r* now is offered free passage, and the eraser pin R whilst sliding along the guide edge 21 on the shoulder 19 of the slide 2 can press the shoulder and thereby the slide 2 back to its starting position. Owing to the forced relative movement of the slides (increasing distance between point 25 and tongue 27) the angualr arm 24 of the slide 1 is returned to snap engagement with the recess 23 of the slide 2. Hereby the position shown in FIG. 1 for the two slides is restored and thereby the cartridge is ready for a new operation cycle writing-reading-erasing.

The arrangement described above can be modified in different ways within the scope of the invention. The stop edge 20 in the shoulder 18 of slide 2, for example, need not have such a great length that the edge, in prepared writing position of the slides, also blocks the reader pin, because the reading of an erased tape has no detrimental consequences, but implies an unnecessary extra load on the reader. Also the other shoulders on the two slides may be varied as to shape and location, provided that the conditions for the correct forced operation sequence are satisfied. The marking of preparedness of the cartridge, of course, may be made dependent on the movement of the slides in a way other than by the window means shown. Furthermore, of course, the shown snap mechanism for a temporary positioning of the slides may be replaced by any other arresting means with equivalent function.

What I claim is:

1. A magnetic tape cartridge arrangement for computer processing of a cartridge in a predetermined operation cycle after manual insertion of said carrridge into a first jack for a writing operation, a second jack for a reading operation, and a third jack for an erasing of data operation, each operation in said cycle being released by a jack actuating pin located in each jack but adapted to change its position from one jack to another along the same line for penetrating into a correspondingly located end recess in the carrridge inserted in the respective jack, comprising at least two slides in opposed longitudinal relation to each other on said cartridge and movable in parallel with each other and said cartridge, said slides being elastically interconnected and provided with shoulders having alternating inclined and plane guide edges and, respectively, stop edges whereby said stop edge blocks the jack actuating pin upon insertion of the cartridge into an incorrect jack and the jack actuating pin is pressed against a guide edge leading into said end recess to release the desired operation upon insertion of the cartridge into the correct jack and to simultaneously displace one of the movable slides to expose a free guide edge only for the jack actuating pin in the subsequent correct jack within the predetermined operation cycle.

2. In an arrangement for computer processing of magnetic tape cartridges, upon manual insertion of said cartridges in a first jack for writing, a second jack for reading, and a third jack for erasing of data, each of said operations being triggered by an actuating pin provided in each jack but differently positioned in the respecrive three jacks by lateral displacement, said actuating pin being adapted to penetrate into a correspondingly positioned end recess of three aligned and spaced end recesses of each of the cartridges inserted in the particular jack, the improvement comprising two opposed parallel slides located at the insertion end of each cartridge, said slides being longitudinally displaceable relative to each other, said two slides being further resiliently interconnected and each being provided at its external longitudinal edge with shoulders having alternating inclined guide edges and plane stop edges such that when the cartridge is inserted in an incorrest jack, the pin of that jack will be blocked by a registering stop edge, but when the cartridge is inserted in the correct jack, the pin thereof will register with an inclined guide edge in front of the corresponding end recess and will be pressed against said guide edge whereby the desired operation is triggered at the same time as the pin effects the longitudinal displacement of the slide carrying said guide edge whereby the guide edge of one of said slides is presented only to the pin in the subsequent correct jack in the operation cycle: writing-reading-erasing, after pulling the cartridge out of the jack.

3. An arrangement according to claim 2, characterized in that with the slides set in a position prepared for writing, corresponding to erased magnet tape, one of said slides shows a guide edge opposite the actuating pin in the writing jack, said pin upon insertion of the cartridge into said jack displaces the first slide longitudinally while elastically retaining a lateral edge on the second slide, said second slide after the removal of the cartridge from said jack is moved along laterally and consecutively to block the passage for the writer pin with a stop edge, a second guide edge on the first slide facing the position for the pin in the reading jack and simultaneously a stop edge facing the position for the pins in the erasing jack, whereby only at the insertion of the cartridge into the reading jack can said pin effect the movement of the first slide by moving the stop edge thereof past the eraser jack actuating pin position, and so that only upon insertion of the cartridge inot the erasing jack can the erasing jack actuating pins act upon a guide edge on the second slide to return said slide to the starting position.

4. An arrangement according to claim 2, characterized in that the stop edge of the second slide, for preventing the reading of an erased tape, has a predetermined length whereby it forms a stop for the reader pin in the position of the slides prepared for writing after said consecutive movement offers a free passage for said pin.

5. An arrangement according to claim 3, wherein the second guide edge of the first slide has an opposite inclination to the first guide edge of said slide, and upon insertion of the cartridge into the reading jack the first slide is returned to its original position, and the eraser pin is divided into two partial pins offset relative to one another along said line to permit one of said partial pins to coact with the stop edge on the first slide, and the second partial pin coacts with the guide edge on the second slide, whereby subsequent to a completed operation cycle, writing-reading-erasing, the slides are returned to their starting position adapted for a direct repetition of the operation sequence.

6. An arrangement according to claim 5, wherein the slides are each provided with at least two visual marking indicators and the positions of said visual marking indicators varies with the individual displacements of the slides relative to a fixed reference sign tO serve as an indication of the state of preparedness of the cartridge.

7. An arrangement according to claim 6, wherein each marking indicator is formed by a colored field, and the reference sign by a window so located in the cartridge housing, that the three states of preparedness are indicated by the appearance of one, the other or both colored fields in said window.

* * * * *